United States Patent [19]

Guerra

[11] Patent Number: 5,452,381
[45] Date of Patent: Sep. 19, 1995

[54] WHEEL BUSHING FOR BICYCLE

[76] Inventor: Antonio Guerra, Castillo de Ocio, 6., 01007 Vitoria - Alava, Spain

[21] Appl. No.: 198,987

[22] Filed: Feb. 18, 1994

[30] Foreign Application Priority Data

Feb. 23, 1993 [ES] Spain ................................. 9300352

[51] Int. Cl.6 ..................... F16C 13/00; B60B 27/00
[52] U.S. Cl. .................. 384/545; 301/105.1; 301/111; 301/120; 384/539
[58] Field of Search ............... 384/537, 539, 543, 544, 384/545, 584, 586, 589; 301/105.1, 131, 132, 111, 120, 121

[56] References Cited

U.S. PATENT DOCUMENTS

| 410,983 | 9/1889 | Lyles et al. | 301/121 |
| 3,967,856 | 7/1976 | Beauchet | 384/545 X |
| 4,154,327 | 5/1979 | Haeussinger | 384/545 X |
| 4,231,670 | 11/1980 | Knoski | 301/121 X |
| 4,961,654 | 10/1990 | Pangburn et al. | 384/542 X |
| 5,188,430 | 2/1993 | Chin | 301/131 X |

*Primary Examiner*—Thomas R. Hannon
*Attorney, Agent, or Firm*—Lucas & Just

[57] ABSTRACT

Bushing for bicycle wheels, which consists of a tubular body that is integral with the bicycle frame and perpendicular to the frame. The bushing includes a free-turning axle coaxially mounted inside the tubular body, with no possibility of axial displacement from same. The bushing further has two hollow revolving hubs that can be coaxially coupled to each other, with no possibility of relative turning. A device is also provided for fastening the two hubs to each other and to the axle. The outer hub is integral with the bicycle wheel in coaxial position, while the inner hub is fastened to the axle, without the capacity to turn in relation to same.

13 Claims, 4 Drawing Sheets

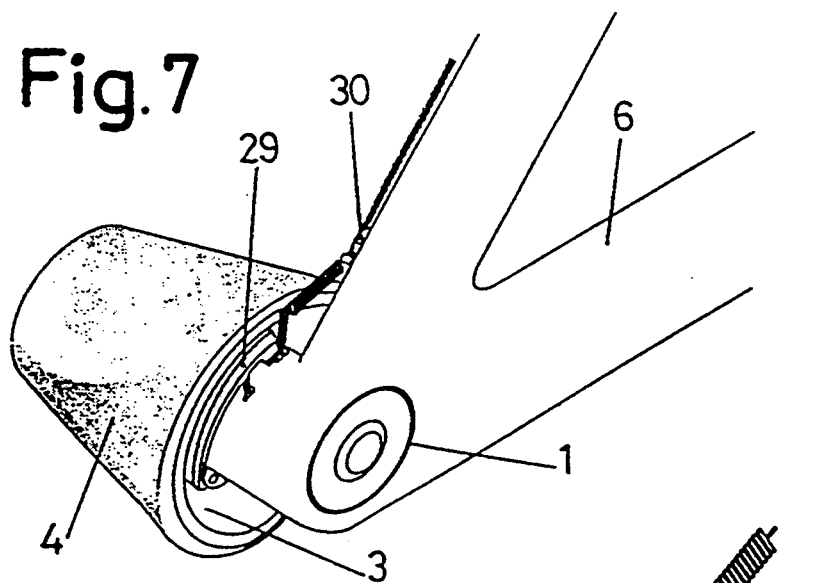
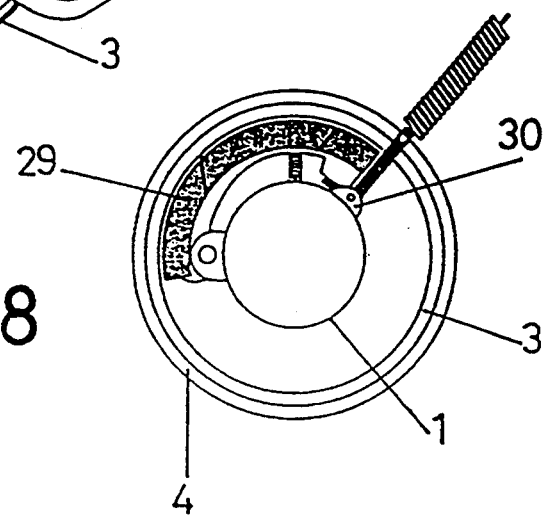
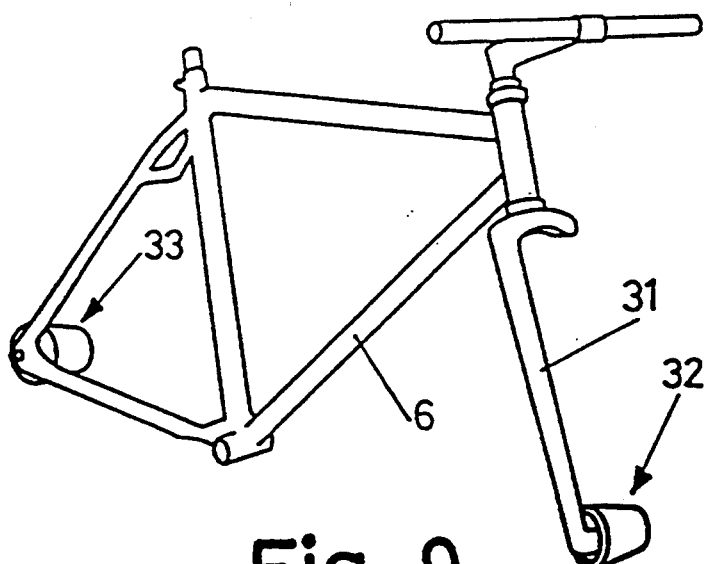

WHEEL BUSHING FOR BICYCLE

This invention concerns a bushing for bicycle wheels, which forms part of the bicycle frame or chassis.

Until now the bushing of bicycle wheels has consisted of a series of components that, as a whole, forms part of the bicycle wheel, including the fastening elements, so that the bicycle frame or chassis defines only the couplings where the wheels are mounted.

The object of this invention is a bushing for bicycle wheels, which forms part of the bicycle frame, so that the wheel only has means of coupling and fastening to the bushing proper.

This construction makes possible mounting of the brakes on the front as well as rear wheels, so that they are totally independent of the wheels, all of which facilitates the operation of mounting and dismounting the wheels and, in addition, makes possible the use of wheels of different diameter.

The bushing of the invention consists of a tubular body that is integral with the bicycle frame and perpendicular to said frame. Inside this tubular body an axle is coaxially mounted, which can turn freely, but whose axial displacement from said body is prevented. The bushing is completed with two hollow revolving hubs that can be coaxially coupled to each other, with no possibility of relative turning. The outer hub is integral with the bicycle wheel in coaxial position, while the inner hub can be fastened to the aforementioned axle, so that any possibility of turning in relation to same is prevented. The bushing has means of fastening the two hubs to each other and to the axle.

The characteristics of the bushing of the invention, as embodied in the claims, as well as the advantages derived from same will become clear below in greater detail, with the aid of the attached drawings, on which a nonlimitative working example is shown.

On the drawings:

FIG. 7 is a perspective similar to FIG. 6, showing a bushing with a different brake system.

FIG. 8 is a front elevation of the bushing included on FIG. 7.

FIG. 9 is a view showing the bushing on a bicycle frame.

As can be appreciated from FIGS. 1 to 4, the bushing of the invention consists of a tubular body referenced with number 1, preferably of cylindrical shape, and an axle 2, also of the general shape of the example described, of two hollow revolving hubs that can be coupled to each other, referenced with numbers 3 and 4, which in the example represented on the drawings are of truncated cone shape, and of a device for fastening the two hubs 3 and 4 to each other and to the axle 2.

Figure 3:
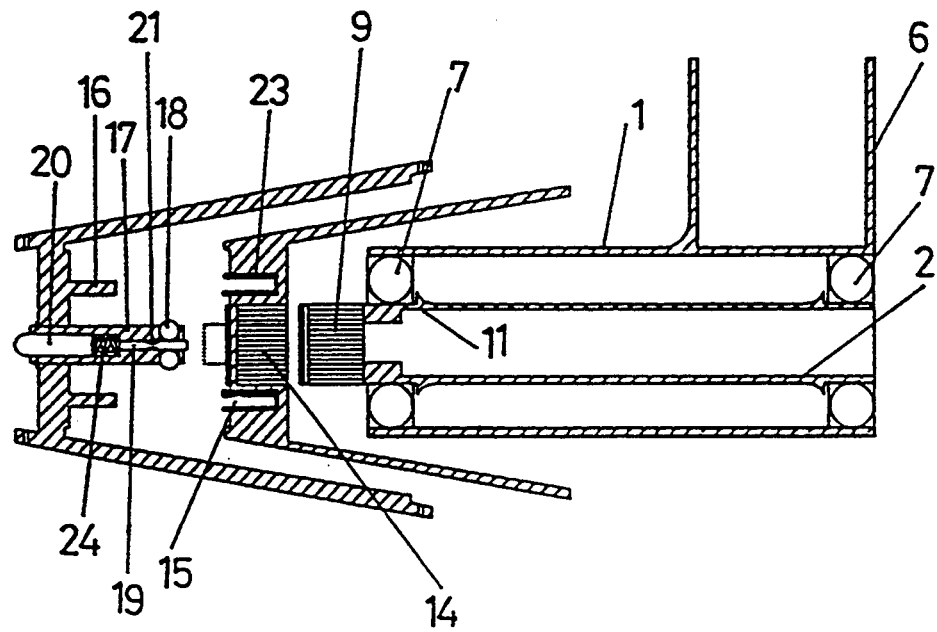
FIG. 3 is a diametral section of the bushing split.
Figure 4:
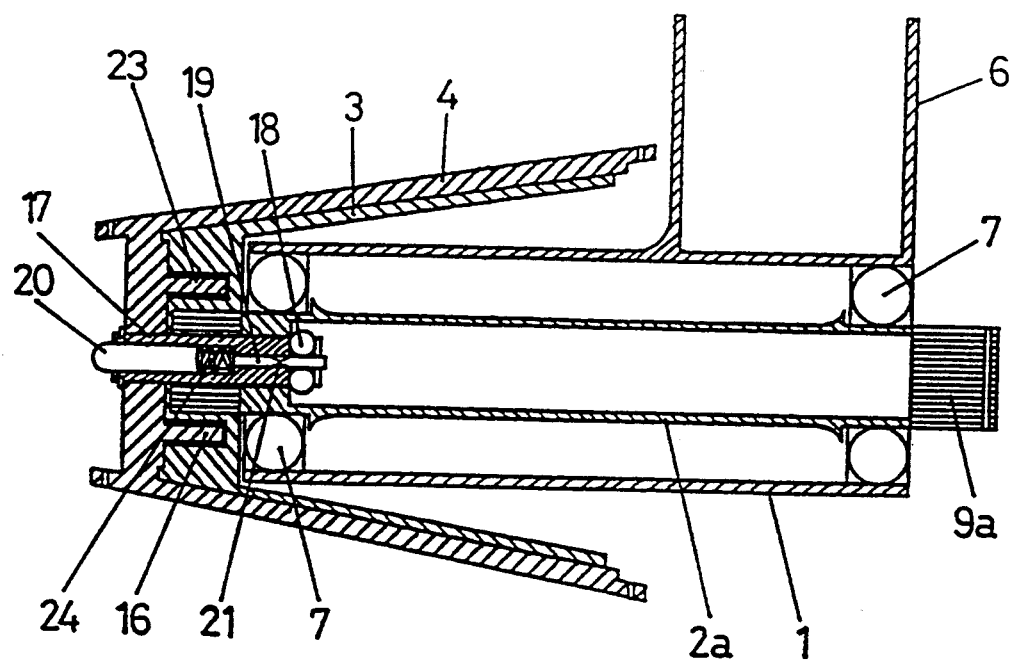
FIG. 4 is a diametral section similar to FIG. 3, with the bushing mounted, including the axle of FIG. 2.
Figure 5:
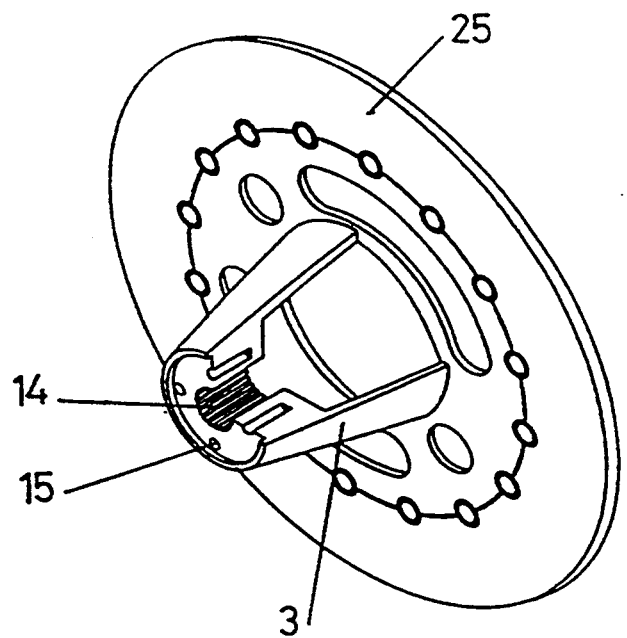
FIG. 5 is a perspective of the outer hub of the bushing, including a brake plate.

The tubular body 1, as can be appreciated on FIGS. 3 and 4, is integral with the frame or chassis 6 of the bicycle, with the axis perpendicular to the plane defined by said frame. Inside this tubular body the axle 3 is mounted by means of bearings 7 that permit the free rotation of said axle in relation to the body 1, but prevent any relative axial displacement. At the ends of the tubular body 1 housings 8 can be attached, for example, by threading, for fastening and adjustment of the bearings 7.

Figure 1:
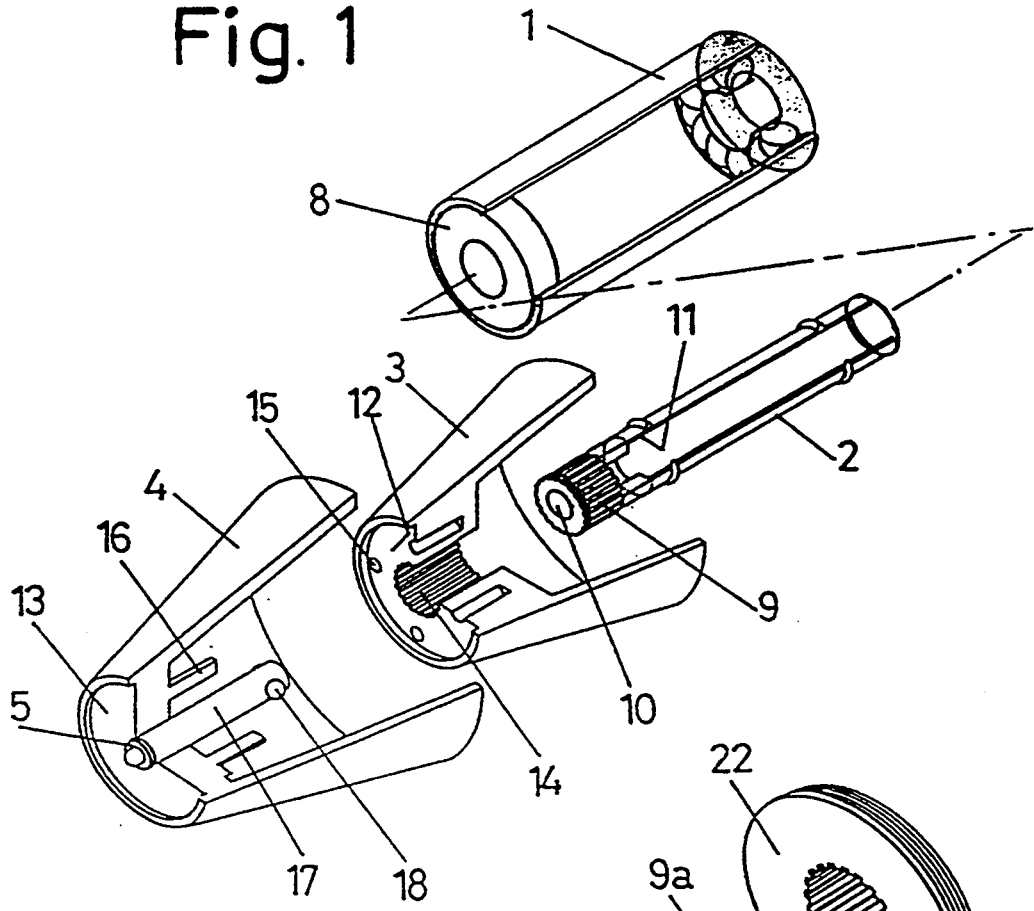
FIG. 1 is a view in split perspective of a bushing for bicycles constructed according to the invention.

In the example represented on FIGS. 1 and 3 the axle 1 projects on one side of the tubular body 1 into a portion 9 that is axially fluted. In addition, the axle 2 presents, starting from the end section adjacent to the fluted portion 9, an axial passage 10 that leads into an inner portion 11 of greater section.

In the example represented on the drawings the axle 2 is hollow, but could be solid, including the passage 10 and the inner portion 11 of greater section. However, the axle being of tubular structure, the weight of the unit is reduced.

The hubs 3 and 4 are dimensioned to be coupled to each other coaxially. Although in the example represented on the drawings they are of truncated cone shape, they could also adopt a cylindrical configuration. Each of the hubs has a cylindrical or cone-shaped revolving wall, which is closed at one of its bases by means of a center core referenced with number 12 on hub 3 and with number 13 on hub 4. The core 12 of the inner hub 3 has a coaxial opening 14 axially fluted and of outline identical to that of the fluted portion 9 of the axle 2. In addition, the core 12 of the hub 3 presents, starting from its outer surface, a series of drill holes 15 which will be brought opposite pivots or lugs 16 projecting from the inner surface of the core 13 of hub 4.

Finally, the core 13 of hub 4 has a sleeve 17 mounted, of diameter approximately equal to that of the axial passage 10 of the axle 2 and projecting inward in hub 4 in a portion of greater length than said passage 10. The wall of the sleeve 17 has drill holes near its inner end, in which are mounted balls 18 that partially project from the inner and outer surfaces of the sleeve 17 and bear on the rod 19 of the piston 20, which can be partially displaced axially inside the sleeve 17. The rod 19 has spherical helmet-shaped recesses capable of partially accommodating the balls 18, when they are in a position opposite same.

Figure 2:
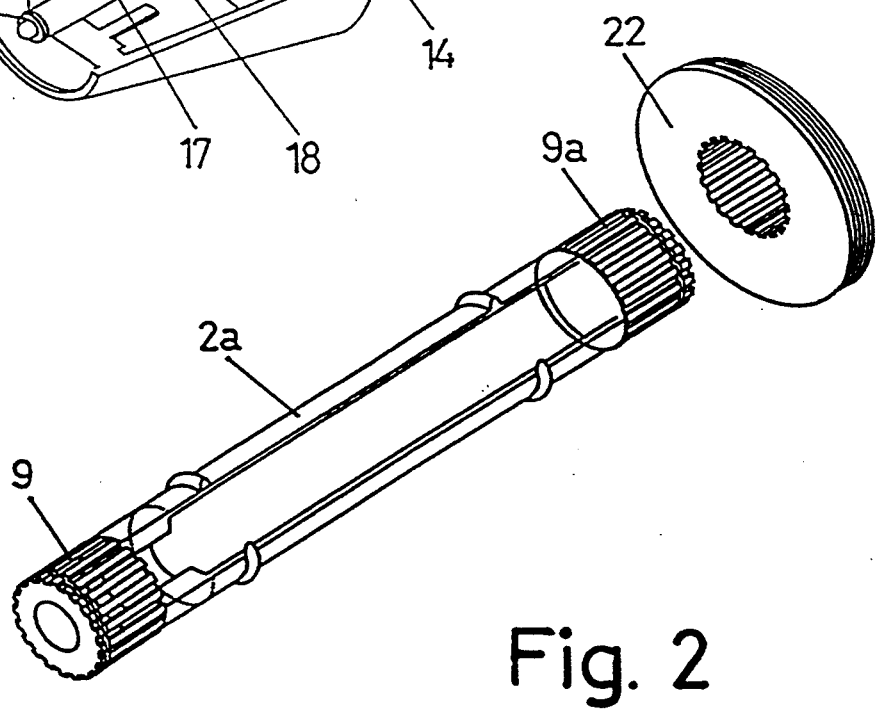
FIG. 2 shows in perspective a variant embodiment of the axle of the bushing.

The axle 2 can adopt the configuration represented on FIG. 2, where it is referenced with number 2a. In this case the axle is of greater length in order to project from the cylindrical body 1 on both sides in axially fluted portions 9 and 9a. The remaining components of the hub will be mounted in portion 9, while a part 2a bearing the drive gear or set of gears will be mounted in portion 9a.

The axle 2 represented on FIG. 1 will be used for the front wheel, while the axle 2a represented on FIG. 2 is intended to form part of the rear wheel bushing.

With the construction in question, as can be appreciated on FIGS. 3 and 4, once the axle 2 or 2a is mounted on the tubular body 1, the inner hub 3 is mounted on the fluted portion 9 of the axle 2. The outer hub 4 is then coupled to the inner hub 3, inserting the pivots 16 in the drill holes 15, preferably with the interposition of liners 23 of rubber or the like which will make it possible to achieve a perfect fit between the hubs, eliminating play and noise. At the same time the sleeve 17 is inserted through the axle passage 10, in which operation the piston 20 is displaced inward, so that the balls 18 are partially accommodated in the recesses 21 of the rod 19.

In this position the balls 18 are retracted toward the inside of the sleeve 17, thus making possible the insertion of said sleeve through the axle passage 10. Once the portion of the sleeve 17 occupied by the balls 18 reaches the inner portion 11 of the axle of greater section and the piston 20 is displaced outward by the action of the spring 24, the balls 18 are driven outward, occupying the position shown on FIG. 4, in which the sleeve 17 is prevented from coming out, thus ensuring the mounting and coupling of the hubs 3 and 4 on the axle 2.

When it is desired to detach the bushing, it will be sufficient to push the piston 20 inward, until the recesses 21 are brought opposite the balls 18, so that the latter can be partially retracted inward, thus making possible the removal of the sleeve 17 and, therefore, separation of the hubs 3 and 4 from the body 1 and from the axle 2.

The hubs 3 and 4, as indicated, are dimensioned to be coaxially coupled to each other, the wall of the inner hub 3 being surrounded by the cylindrical body 1.

The outer hub 4 will be integral with the bicycle, to which it will be fastened in coaxial position.

Mounting and dismounting of the wheels with the bushing described can be carried out easily and rapidly, since it is just sufficient to work the piston, thus releasing or fastening the two hubs 3 and 4 to each other and to the axle 2, as described.

On the other hand, the bushing system described makes it possible to exchange the front and rear wheels on all bicycles, which is very advantageous. Bicycles equipped with the bushing of the invention make it possible to use brakes that remain integrated in the unit when the wheel is dismounted, with the advantages resulting therefrom, like clean and mechanically simple mounting and dismounting of the wheel and the opportunity to use wheels of different diameter for the same bicycle, such as wheels of road and mountain bicycles.

Figure 6:
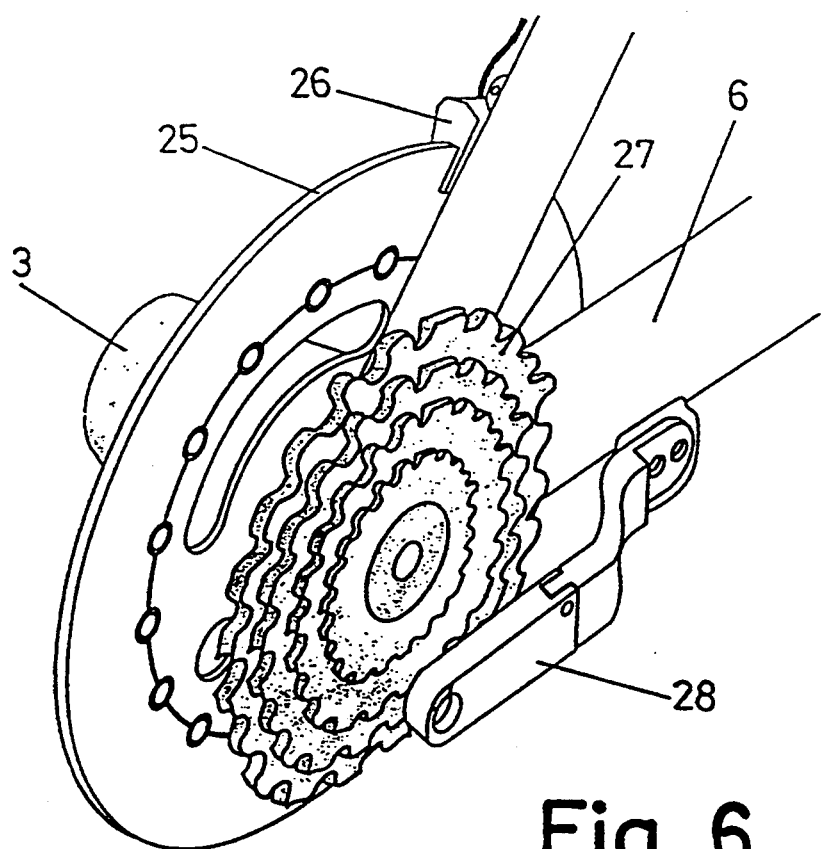
FIG. 6 is a perspective of the rear bushing of a bicycle, including the outer hub of FIG. 5 and a change gear cluster.

The wall of the inner hub 3 can be finished off in a plate 25 usable as brake disk, as represented on FIG. 6, having the brake clamp 26 on its edge. On FIG. 6 one can further appreciate how, at the end 9a of the axle, a change gear cluster 27 is mounted, the support 28 of which is represented.

As is shown on FIGS. 7 and 8, between the wall of the inner hub 3 and the cylindrical body, brake shoes 29 can be arranged, driven by means of the mechanism 30 that presses them on the inner surface of the housing 3, which thus acts as a brake drum.

In any case, the wheel can be taken off without having to act on the drive chain and on the brake system, which facilities mounting and dismounting of the wheel and reduces the time of changing same.

As can be seen, the bushing of the invention makes it possible to use different types of brakes, drum as well as disk, and eliminates the necessity to mount and detach the chain every time the rear wheel has to be changed.

Through an "elastic" drive system, the initial resistance to forward motion is reduced, especially when an instant or "fail" acceleration is sought. In these situations the traditional drive system necessitates a very intense muscular effort that is applied on a fixed resistance to forward motion and only begins to diminish when the effects of the first intense muscular action make it possible to break the instant inertia by the combination of bicycle and rider.

With the new drive system, thanks to a simple elastic mechanism, which can be situated on the line of traction, an absorption or reduction of the instantaneous muscular effort characterizing a sudden change of rhythm is made possible. The initial resistance to forward motion diminishes instantly (by elastic deformation) with application of the first muscular effort, a mechanical effect being produced similar to that generated when we push a moving object, which has already broken the state of static equilibrium. This behavior affords major advantages, such as improvement of the saving of muscular effort and reduction of the stresses to which the tendons are subjected.

The bushing of the invention makes possible the construction of a bicycle frame or chassis with the structure shown on FIG. 9, in which the front fork is reduced to a single arm 31, at the end of which the front bushing is mounted on an axis perpendicular to that defined by the bicycle frame or chassis. Similarly, on the back of the frame a rear bushing 33 with the characteristics already explained is mounted, bushings 32 and 33 being directed toward the side opposite that occupied by the drive chain.

I claim:

1. Bushing for bicycle wheels, characterized in that it comprises a tubular body that is integral with the bicycle frame and perpendicular to said frame; an axle coaxially mounted inside the tubular body, which can turn freely and with no possibility of axial displacement from said body; two hollow revolving hubs that can be coaxially coupled to each other, with no possibility of relative turning, the outer hub being integral with the bicycle wheel in coaxial position and the inner hub being connectable to the aforementioned axle without the capacity to turn in relation to same; and a means of fastening the two hubs to each other and to the axle.

2. Bushing according to claim 1, characterized in that the tubular axis of the body projects perpendicular to the bicycle frame.

3. Bushing according to claim 1, characterized in that the axle is mounted on the tubular body by means of bearings that prevent relative axial displacement between body and axle.

4. Bushing according to claim 3, characterized in that the axle projects from the tubular body, at least on one side, in an axially fluted portion on which the inner hub is mounted.

5. Bushing according to claim 3, wherein said frame further comprises a drive chain and drive gear or gear cluster characterized in that the axle projects from the tubular body on both sides, each in axially fluted portions, on one of which, the portion directed toward the side opposite that occupied by the drive chain, the inner hub is mounted, while the drive gear or gear cluster is mounted on the other portion.

6. Bushing according to claim 1, characterized in that the axle projects from the tubular body, at least on one side, in an axially fluted portion on which the inner hub is mounted.

7. Bushing according to claim 1, wherein said frame further comprises a drive chain and drive gear or gear cluster characterized in that the axle projects from the tubular body on both sides, each in axially fluted portions, on one of which, the portion directed toward the side opposite that occupied by the drive chain, the inner hub is mounted, while the drive gear or gear cluster is mounted on the other portion.

8. Bushing according to claim 1, characterized in that the means for fastening the hubs to each other and to the axle comprise a cylindrical sleeve that is attached in a drill hole in the core of the outer hub and projects inside said hub in a portion inserted through a coaxial passage of the axle and whose outer section is approximately equal to that of said passage and of greater length, which sleeve has drill holes on its wall, near the inner end, each of which accommodates a ball that partially projects from the surfaces of said wall and situated in the inner portion of said axle of greater section, said balls being retractable and extractable by means of axial displacement of a piston housed inside the sleeve.

9. Bushing according to claim 1, characterized in that the axle is hollow, at least partially, and presents, starting from the end section adjacent to an axially fluted portion on which the inner hub is mounted, a coaxial passage that leads into an inner portion of greater section.

10. Bushing according to claim 9, characterized in that the means for fastening the hubs to each other and to the axle consist of a cylindrical sleeve that is attached in a drill hole in the core of the outer hub and projects inside said hub in a portion inserted through the aforesaid coaxial passage of the axle and whose outer section is approximately equal to that of said passage and of greater length, which sleeve has drill holes on its wall, near the inner end, each of which accommodates a ball that partially projects from the surface of said wall and situated in the inner portion of said axle of greater section, said balls being retractable and extractable by means of axial displacement of a piston housed inside the sleeve.

11. Bushing according to claim 1, characterized in that the hubs comprise a cylindrical revolving wall, or a cone-shaped revolving wall that is closed at the narrower base, by means of a center core, the core of the inner hub having an axially fluted cylindrical coaxial opening, dimensioned to be adjustably mounted by sliding on a corresponding fluted portion of the axle, while the core of the outer hub has a coaxial through hole, the cores of both hubs further possessing, on their facing surfaces, pivots and drill holes that can be plugged to prevent relative turning between both hubs.

12. Bushing according to claim 11, characterized in that the wall of the inner hub carries a circular plate fastened on its free edge, on which brake shoe holders are mounted.

13. Bushing according to claim 11, characterized in that shoes are placed inside the wall of the inner hub, which can be driven toward the inner surface of said hub by means of a brake drive mechanism.

* * * * *

UNITED STATES PATENT AND TRADEMARK OFFICE
CERTIFICATE OF CORRECTION

PATENT NO. : 5,452,381
DATED : September 19, 1995
INVENTOR(S) : Antonio Guerra

It is certified that error appears in the above-indentified patent and that said Letters Patent is hereby corrected as shown below:

Column 3, line 25, change "Just" to --just--.

Column 4, line 35 (claim 2), change "tubular axis of the body" to --axis of the tubular body--.

Signed and Sealed this

Twelfth Day of March, 1996

Attest:

BRUCE LEHMAN

Attesting Officer     *Commissioner of Patents and Trademarks*